United States Patent Office 2,858,353
Patented Oct. 28, 1958

2,858,353
SEPARATOR FOR ALKALINE BATTERIES

Meyer Mendelsohn, New York, N. Y., assignor to Ions Exchange & Chemical Corp., New York, N. Y., a corporation of New York No Drawing. Application July 6, 1954
Serial No. 441,649

13 Claims. (Cl. 136—146)

My present invention relates to inter-electrode separators for alkaline batteries, e. g. batteries of the silver-zinc type in which the electrodes are closely confined in a casing and are applied under pressure against semi-permeable membranes.

Sheets of methyl cellulose are excellent separators for alkaline batteries of the aforementioned type, because of the fact that they resist oxidation by silver peroxide as well as penetration by zinc. Because of the relatively high resistance of methyl cellulose film, however, little use has been made in the past of separators of this kind.

My invention has for its object the provision of a methyl cellulose film whose resistance is low enough to enable the use of such film as a separator in a high-efficiency battery particularly (but not exclusively) of the aforementioned silver-zinc type.

I have found, in accordance with this invention, that the desired low-resistance methyl cellulose film can be obtained by admixing an aqueous solution of a water-soluble alkali salt of a polymeric compound with an aqueous methyl cellulose solution. For purposes of this disclosure, and in keeping with established practice, the term "alkali" is intended to embrace not only the alkali metals proper, such as sodium or potassium, but also ammonium.

The water-soluble alkali salt of this invention may be, more specifically, a salt of alginic acid or of a sulfonated polystyrene or derivative thereof. The last-mentioned group includes, more particularly, an alkali salt of a sulfonated polystyrene, e. g. of a compound which is commercially available under the name Lustrex. Reference is also made to my co-pending application Ser. No. 349,091, filed April 15, 1953, which discloses a process of sulfonating polystyrene and other high polymers in the presence of silver oxide; neutralization of the resulting sulfonic and sulfuric acids, e. g. by means of sodium or ammonium hydroxide, yields aqueous solutions of sodium or ammonium salts, respectively, of sulfonated polystyrene similar to the aforementioned Lustrex compounds.

It may be mentioned that the use of ammonium salts is not recommended in the presence of electrodes containing silver.

If a very flexible film is desired, a plasticizer can be incorporated in the modified methyl cellulose film.

EXAMPLE I

Equal parts of an 8% aqueous solution of methyl cellulose and of a 4% aqueous solution of sodium, potassium or ammonium alginate are mixed together and cast into a film on a non-adherent surface (e. g. glass). A glycol plasticizer, e. g. diethylene glycol, is optionally added to this mixture before casting, preferably in a ratio of 10–30%, by weight, of dry film.

EXAMPLE II

Equal parts of an 8% aqueous solution of methyl cellulose and of a 20% aqueous solution of Lustrex, or of a sodium, potassium or ammonium salt obtained in the manner described above with reference to my co-pending application Ser. No. 349,091, are mixed together and cast into a film, optionally with the addition of a plasticizer as set forth in the preceding example.

The resistance-reducing additives according to this invention, and in particular the alkali salts specifically disclosed herein, have in common the following desirable properties:

(a) Abundance of ionogenic groups;
(b) High oxidation resistance;
(c) Ability to resist strongly alkaline electrolytes;
(d) Gel character, insuring adequate permeability.

The proportions given in the foregoing examples may be varied over a relatively wide range, as will be apparent from the following tables in which the proportion of the respective additive has been plotted against electrical resistance and tensile strength. It will be observed that a film containing 0% additive (100% methyl cellulose) has a tensile strength of the order of 900 kg./cm.$^2$, coupled with a very high resistance in excess of 45 ohms-cm.$^2$. With progressively larger additive ratios the resistance falls to a fraction of its original value, the limit of the useful range being reached when the film becomes too fragile for handling.

Table I

| Alginate, parts | Methyl Cellulose, parts | Electrical Resistance, ohms-cm.$^2$ | Tensile Strength, kg./cm.$^2$ |
|---|---|---|---|
| 0 | 100 | over 45 | 895 |
| 11 | 89 | 7.2 | 415 |
| 25 | 75 | 3.9 | 375 |
| 33 | 67 | 1.9 | 325 |
| 67 | 33 | 0.08 | 250 |
| 75 | 25 | negligible | |

Useful range of ratio (parts by weight) alginate/methyl-cellulose: Approximately 1:10 to 2:1.

Table II

| Lustrex, parts | Methyl Cellulose, parts | Electrical Resistance, ohms-cm.$^2$ | Tensile Strength, kg./cm.$^2$ |
|---|---|---|---|
| 0 | 100 | over 45 | 895 |
| 10 | 90 | 2 | 635 |
| 33 | 67 | 1.1 | 510 |
| 71.5 | 28.5 | 0.75 | 380 |
| 91 | 9 | 0.75 | 330 |
| 100 | 0 | negligible | |

Useful range of ratio (parts by weight) Lustrex/methyl-cellulose: Approximately 1:10 to 10:1.

Separators according to the invention may, of course, be used in alkaline electrolytic systems other than batteries. The concentrations set forth in the examples are subject to considerable variations and are merely illustrative of conditions under which a good film can normally be obtained.

I claim:

1. A semi-permeable sheet incorporating a mixture of methyl cellulose and an alkali salt of a polymeric compound selected from the group which consists of alginic acid and sulfonated polystyrene.

2. A semi-permeable sheet incorporating a mixture of methyl cellulose, an alkali salt of a polymeric compound selected from the group which consists of alginic acid and sulfonated polystyrene, and a plasticizer.

3. A semi-permeable sheet incorporating a mixture of methyl cellulose, an alkali salt of a polymeric compound selected from the group which consists of alginic acid and sulfonated polystyrene, and a glycol plasticizer.

4. A semi-permeable sheet incorporating a mixture of methyl cellulose and an alkali alginate.

5. A semi-permeable sheet incorporating a mixture of methyl cellulose, an alkali alginate and a glycol plasticizer.

6. A semi-permeable sheet incorporating a mixture of methyl cellulose and an alkali alginate, said alginate being present in a proportion ranging between substantially 10% and 200%, by weight, of said methyl cellulose.

7. A semi-permeable sheet incorporating a mixture of methyl cellulose, an alkali alginate and a glycol plasticizer, said alginate being present in a proportion ranging between substantially 10% and 200%, by weight, of said methyl cellulose.

8. A semi-permeable sheet incorporating a mixture of methyl cellulose and an alkali salt of sulfonated polystyrene.

9. A semi-permeable sheet incorporating a mixture of methyl cellulose, an alkali salt of sulfonated polystyrene and a glycol plasticizer.

10. A semi-permeable sheet incorporating a mixture of methyl cellulose and an alkali salt of sulfonated polystyrene, said alkali salt being present in a proportion ranging between substantially 10% and 1000%, by weight, of said methyl cellulose.

11. A semi-permeable sheet incorporating a mixture of methyl cellulose, an alkali salt of sulfonated polystyrene and a glycol plasticizer, said alkali salt being present in a proportion ranging between substantially 10% and 1000%, by weight, of said methyl cellulose.

12. A process for making a separator for alkaline batteries, comprising the steps of admixing an aqueous solution of a water-soluble alkali salt of a polymeric compound with an aqueous solution of methyl cellulose, said polymer being selected from the group which consists of alginic acid and sulfonated polystyrene, and casting the mixture into a film.

13. A process for making a separator for alkaline batteries, comprising the steps of admixing an aqueous solution of a water-soluble alkali salt of a polymeric compound and a glycol plasticizer with an aqueous solution of methyl cellulose, said polymeric compound being selected from the group which consists of alginic acid and sulfonated polystyrene, and casting the mixture into a film.

References Cited in the file of this patent

UNITED STATES PATENTS

| | | |
|---|---|---|
| 2,161,561 | Dalton | June 6, 1939 |
| 2,482,062 | Hanson | Sept. 13, 1949 |
| 2,487,106 | Cornwell | Nov. 8, 1949 |
| 2,534,336 | Cabon | Dec. 19, 1950 |
| 2,607,809 | Pitzer | Aug. 19, 1952 |
| 2,636,851 | Juda et al. | Apr. 28, 1953 |
| 2,653,985 | Philipps | Sept. 29, 1953 |
| 2,653,987 | Baty | Sept. 29, 1953 |
| 2,662,929 | Dague | Dec. 15, 1953 |
| 2,673,887 | Booth | Mar. 30, 1954 |
| 2,678,961 | Uhlig et al. | May 18, 1954 |
| 2,696,515 | Koren et al. | Dec. 7, 1954 |
| 2,747,009 | Kirkwood et al. | May 22, 1956 |

FOREIGN PATENTS

| | | |
|---|---|---|
| 708,350 | Great Britain | May 5, 1954 |